3,030,397
ORGANO BIMETALLIC COMPOSITIONS
Richard D. Gorsich, Baton Rouge, La., assignor to Ethyl Corporation, New York, N.Y., a corporation of Delaware
No Drawing. Filed Mar. 31, 1961, Ser. No. 99,679
3 Claims. (Cl. 260—429.7)

This invention relates to a novel process for the manufacture of certain useful bimetallic compounds, specifically, organo and halo manganese carbonyl ligand compounds of metals of group IV–A of the periodic system of the elements.

Heretofore, certain organic and inorganic metal carbonyls have been suggested as gasoline additives, primarily for the purpose of increasing the antiknock ratings of the gasolines. For example, manganese pentacarbonyl is a highly effective antiknock agent both when used as the sole antiknock agent and when used in combination with alkyllead antiknock compounds, e.g., tetraethyllead. Effective as many of these carbonyl compounds may be, however, they all exhibit certain shortcomings in use which materially decrease their value for the stated purpose. For example, their use is generally associated with more or less severe engine wear and with a shortened useful life of the exhaust valves. It is a specific and valuable property of the compounds produced by the process of this invention that they minimize these particular problems; as a result of their unusual chemical structure they do have good antiknock properties and yet they do not have the above substantial adverse effects of markedly increasing engine wear and impairing exhaust valve durability.

Accordingly, it is an object of this invention to provide a novel and effective method for the preparation of useful organo and halo manganese carbonyl ligand compounds of metals of group IV–A of the periodic system of the elements. Another object is to provide a novel and effective method for the preparation of such compounds in high yield and purity. A further object is to provide compounds which exhibit the good antiknock effectiveness of manganese carbonyls but which are free from the marked disadvantages of shortened exhaust valve life and high engine wear associated with the use of prior metallic carbonyls in general. These and other important objects of this invention will become apparent hereinafter.

The novel process of this invention is a carbonyl replacement process wherein an organo derivative of phosphorus, arsenic or antimony is reacted with an organo or halo group IV–A manganese pentacarbonyl compound. The organo group IV–A metal manganese pentacarbonyl reactant is represented by the general formula

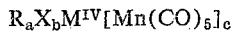
$$R_a X_b M^{IV}[Mn(CO)_5]_c$$

In this formula, R represents a hydrocarbon group, preferably an alkyl, alkenyl, aryl, cycloalkyl, aralkyl or alkaryl radical containing up to about 18 carbon atoms; X is a haogen atom, e.g., chlorine, bromine or iodine; $M^{IV}$ is silicon, germanium, tin or lead; $a$ and $b$ are small whole numbers from 0 to 3, inclusive, at least one of which is equal to at least 1; $c$ is a small whole number from 1 to 3, inclusive; and the sum of $a$, $b$ and $c$ is equal to 4. In this process, one of the carbonyl groups of each manganese pentacarbonyl radical of the above described reactant is replaced by an organic ligand of the formula $ER'_3$ wherein E is phosphorus, arsenic or antimony and R′ represents a hydrocarbon or oxyhydrocarbon group, the hydrocarbon portions of which may be alike or different and are preferably alkyl, alkenyl, aryl, cycloalkyl, aralkyl or alkaryl radicals containing up to about 18 carbon atoms. Of the carbonyl reactants, triphenyltin manganese pentacarbonyl is particularly preferred because of its ease of preparation and because of its relative volatility and solubility in organic solvents which markedly facilitate its purification and reaction in the instant process. Of the ligand compounds, triphenylphosphine is preferred because of its stability and accessibility and because of the stability and ease of preparation of the resulting complexes. Thus, a particular embodiment of this invention is the reaction of triphenyltin manganese pentacarbonyl with triphenylphosphine. Other embodiments will be evident as the discussion proceeds.

Illustrative of the carbonyl reactants are triphenyllead manganese pentacarbonyl, diphenylchlorolead manganese pentacarbonyl, ethyldichlorotin manganese pentacarbonyl, dibenzylbromogermanium manganese pentacarbonyl, dimethylethyltin manganese pentacarbonyl, tridodecylsilicon manganese pentacarbonyl, tri-m-cumenylgermanium manganese pentacarbonyl, tribenzyllead manganese pentacarbonyl, trimesityltin manganese pentacarbonyl, divinylethylsilicon manganese pentacarbonyl, tri-p-tolylgermanium manganese pentacarbonyl, triethyltin manganese pentacarbonyl and triphenylgermanium manganese pentacarbonyl. Of these reactants, the triaryltin manganese pentacarbonyl compounds, especially triphenyltin manganese pentacarbonyl, are preferred because of their ease of separation and because of their solubility in organic solvents which markedly facilitates their purification and reaction.

Illustrative of the ligand reactants are triphenylphosphine, trimethylarsine, tri-n-butylstibine, triisooctylphosphite, triethylarsenite, tridodecylstibine, triallylphosphite, trivinylarsine, triphenylantimonite, tri-o-tolylphosphine, tris-m-ethylphenylarsine, and tribenzylstibine. Of these ligand reactants, triphenylphosphine, is especially preferred because of its ease of preparation and because of its solubility in organic solvents, which markedly facilitates its purification.

The process of this invention is carried out by bringing the reactants together in the presence or absence of a solvent and generally, but not necessarily, at an elevated temperature. Preferably, the reactants are fused together at a temperature in the range of 100–350 C. Temperatures in the range of 175–250° C. are preferred because under these conditions the reaction proceeds at a satisfactory rate, the reactants and products exhibit adequate stability, and these temperatures are within the liquid range of the selected high-boiling solvents if such are used. Typical of the high-boiling solvents which can be used are the following: tetrahydronaphthalene, decahydronaphthalene, o-xylene, m-xylene, p-xylene, benzyl butyl ether, benzyl ethyl ether, butyl phenyl ether, butyl-o-tolyl ether, butyl-m-tolyl ether, butyl-p-tolyl ether, heptyl phenyl ether, and bis(p-chorophenyl) ether.

The reaction is normally carried out at atmospheric pressure, but elevated pressure can be used if it is desired to use lower boiling solvents and is recommended for the more volatile reactants.

Typical of the lower boiling solvents which can be used are the following: toluene, ethyl benzene, chloro benzene, ethyl amyl ether, ethyl isoamyl ether, beta-chloroethyl ether, beta-bromo ethyl ether and bis-chloromethyl ether.

It is preferred to use the reactants in essentially stoichiometric proportions of one mole of the ligand compound per mole of manganese pentacarbonyl in the organo group IV–A manganese pentacarbonyl reactant because problems of separation and recovery are avoided thereby, at least in part, but an excess of one reactant or the other may be used, if desired, to drive the reaction toward completion.

The foregoing reaction proceeds smoothly under the prescribed conditions, reaching completion for the phenyl derivatives in 2 to 6 hours. Somewhat shorter reaction times are satisfactory for the lower alkyl derivatives and somewhat longer ones are desirable for the more highly substituted aryl derivatives and for those derivatives containing highly substituted ligands. In any event, reaction periods up to about 10 hours are quite adequate for good yields.

The carbonyl reactants can readily be prepared by the reaction of an alkali metal manganese pentacarbonyl with an organometallic halide of a metal of group IV–A of the periodic system, i.e., silicon, germanium, tin or lead, in an inert organic solvent such as tetrahydrofuran. This reaction occurs rapidly when the components are stirred together in tetrahydrofuran solution at room temperature.

The products of the novel processes of this invention are of considerable value in the chemical and allied arts. For example, they are potent antiknock agents and in this utility they are versatile agents in that they are highly effective in both unleaded and conventional leaded gasolines made from a wide variety of base stocks. An additional feature of these compounds is that when they are used as antiknock agents, the engine wear and exhaust valve durability characteristics of the engine are not markedly impaired, which is the situation brought about by the use of metallic carbonyls heretofore known and so employed.

The invention will be more fully understood by reference to the following illustrative examples in which all parts and percentages are by weight.

Example I

A mixture of 4.0 grams (0.0074 mole) of triphenyltin manganese pentacrabonyl and 1.92 grams (0.0074 mole) of triphenylphosphine was heated at about 200° C. for 2 hours, after which the liquid reaction mixture crystallized to give 5.4 grams (95%) of triphenyltin manganese tetracarbonyl triphenylphosphine, melting at 224–230° C. Recrystallization from a mixture of benzene and ethanol raised the melting point to 229–230° C.

Example II

A mixture of 4.0 grams (0.00734 mole) of triphenyltin manganese pentacarbonyl and 2.20 grams (0.00735 mole) of triphenylarsine was heated at 188–200° C. for 5¾ hours. The product was refluxed in ethanol for several minutes and filtered while hot. Most of the product was insoluble and the solid was dissolved in a minimum of benzene. Refluxing ethanol was added slowly until crystals began to settle out. The mixture was allowed to cool to room temperature and the product was filtered off to give 2.4 grams of white crystals, melting at 220–222° C. The product was recrystallized to give a 40% yield of triphenyltin manganese tetracarbonyl triphenylarsine.

Example III 3.78 parts of diphenylchlorotin manganese pentacarbonyl is mixed with 40 parts of tetralin and to the mixture is added 3.64 parts of tris(m-ethylphenyl)antimonite, the resultant mixture being heated to a temperature of 195–205° C. for a period of 3 hours. Upon cooling the reaction mixture, diphenylchlorotin manganese tetracarbonyl tris(m-ethylphenyl)antimonite is obtained.

Example IV

To 4.11 parts of diphenylbromotin manganese pentacarbonyl, 1.70 parts of tricyclopentadienylphosphine is added. The mixture is mixed with 20 parts of decalin and heated to 180–188° C. for 2 hours. The product obtained is diphenylbromotin manganese tetracarbonyl tricyclopentadienylphosphine.

Example V 4.13 parts of phenyldichlorolead manganese pentacarbonyl is placed in a reactor and, after the addition of 15 parts of benzyl butyl ether, 1.17 parts of trivinylarsine is introduced. The reactor is sealed and heated to 200–208° C. for 2¼ hours. After the reactor is cooled and vented, phenyldichlorolead manganese tetracarbonyl trivinylarsine is obtained.

Example VI

When 4.79 parts of phenyldibromolead manganese pentacarbonyl is mixed with 3.28 parts of triphenethylstibine and 50 parts of butyl phenyl ether and the mixture is heated to reflux for 3 hours, phenyldibromolead manganese tetracarbonyl triphenethylstibine is obtained.

Example VII

Heptyl phenyl ether solutions of 2.01 parts of trimethylsilicon manganese pentacarbonyl and 1.20 parts of tripropylphosphine are mixed and the mixture is dissolved in 10 parts of heptyl phenyl ether. The solution is heated under pressure for 2 hours. The product is trimethylsilicon manganese tetracarbonyl tripropylphosphine.

Example VIII

Diethylgermanium bis(manganese pentacarbonyl) (3.91 parts) and triisobutylarsenite (2.70 parts) are dissolved in 35 parts of cumene. The solution is heated under reflux for a period of 4.5 hours. Diethylgermanium bis(manganese tetracarbonyl triisobutylarsenite) is obtained in good yield.

Example IX

Propyltin tris(manganese pentacarbonyl) (5.52 parts) and trioctylstibine (10.38 parts) are dissolved in 100 parts of durene. The solution is heated under reflux for 3 hours. Propyltin tris(manganese tetracarbonyl trioctylstibine) is obtained.

Example X

When 4.30 parts of tributyllead manganese pentacarbonyl and 5.66 parts of tricetylphosphite are mixed and the mixture is heated for 3 hours with 80 parts of isodurene at 178–186° C., tributyllead manganese tetracarbonyl tricetylphosphite is obtained.

Example XI

A mixture of bis (neopentyl)silicon bis(manganese pentacarbonyl) (4.21 parts) and triallylarsine (2.97 parts) is heated under pressure at 185–195° C. for a period of 4.5 hours. The product is bis(neopentyl)silicon bis(manganese tetracarbonyl triallylarsine).

Example XII

A mixture of 5.98 parts of decylgermanium tris(manganese pentacarbonyl), 19.70 parts of trioctadecenylantimonite and 100 parts of decalin is heated at 183–192° C. for a period of 6 hours. The product is decylgermanium tris(manganese tetracarbonyl trioctadecenylantimonite).

Example XIII 7.42 parts of tricetyltin manganese pentacarbonyl is dissolved in 50 parts of benzyl butyl ether and 1.97 parts of triphenylphosphine is introduced into the solution. The resulting mixture is heated under pressure for 5½ hours at 205–212° C. Tricetyltin manganese tetracarbonyl triphenylphosphine is thus obtained.

Example XIV 4.89 parts of divinyllead bis(manganese pentacarbonyl) is treated with 7.21 parts of tri-m-cumenylarsenite. Reaction for 4½ hours at 195–207° C. results in the formation of divinyllead bis(manganese tetracarbonyl tri-m-cumenylarsenite).

Example XV

To 4.90 parts of allylsilicon tris(manganese pentacarbonyl), 7.14 parts of tricyclopentadienylstibine and 90 parts of heptyl phenyl ether are added and the mixture is heated at 244–255° C. for 4½ hours. The product is allylsilicon tris(manganese tetracarbonyl tricyclopentadienylstibine).

Example XVI

When 7.67 parts of trioctadecenylgermanium manganese pentacarbonyl and 2.64 parts of tribenzylphosphite are mixed with 100 parts of cumene and heated to 135–147° C. for a period of 5½ hours, trioctadecenylgermanium manganese tetracarbonyl tribenzylphosphite is obtained.

Example XVII

To 5.39 parts of bis(2,5-xylyl)tin bis(manganese pentacarbonyl), 6.49 parts of trimesitylarsine and 110 parts of durene are added. The mixture is heated to 183–190° C. and is maintained at that temperature for 6 hours. The product is bis(2,5-xylyl)tin bis(manganese tetracarbonyl trimesitylarsine).

Example XVIII m-Cumenyllead tris(manganese pentacarbonyl) 6.84 parts), tri-alpha-naphthylantimonite (12.40 parts) and isodurene (190 parts) are heated together for 6½ hours at 185–193° C. m-Cumenyllead tris(manganese tetracarbonyl tri-alpha-naphthylantimonite) is obtained.

Example XIX

A mixture of tris(methylcyclopentadienyl)silicon manganese pentacarbonyl (3.45 parts) and trimethylphosphine (0.57 part) is heated for 3 hours at 185–202° C. The product is tris(methylcyclopentadienyl)silicon manganese tetracarbonyl trimethylphosphine.

Example XX

To 4.72 parts of dicyclohexylgermanium bis(manganese pentacarbonyl), 3.78 parts of tripropylarsenite is added; the mixture is heated under pressure to 187–200° C. and is maintained at this temperature for 3½ hours. The product is dicyclohexylgermanium bis(manganese tetracarbonyl tripropylarsenite).

Example XXI 5.96 parts of benzyltin tris(manganese pentacarbonyl) is added to 6.59 parts of triisobutylstibine and 50 parts of benzyl butyl ether. Reaction for 3 hours at 203–215° C. results in the formation of benzyltin tris(manganese tetracarbonyl triisobutylstibine).

Example XXII

When 5.38 parts of triphenethyllead manganese pentacarbonyl is mixed with 3.14 parts of trioctylphosphite and 70 parts of butyl phenyl ether and the mixture is heated for 4½ hours at 198–205° C., triphenethyllead manganese tetracarbonyl trioctylphosphite is obtained.

Example XXIII 4.71 parts of bis(o-ethylphenyl)silicon bis(manganese pentacarbonyl) and 11.27 parts of tricetylarsine are mixed and the mixture is heated for 5 hours at 241–253° C. The product is bis(o-ethylphenyl)silicon bis(manganese tetracarbonyl tricetylarsine).

Example XXIV 25.8 parts of mesityl germanium tris(manganese pentacarbonyl), 6.59 parts of triallylantimonite and 100 parts of cumene are mixed. The mixture is heated under pressure to 160–165° C. and is maintained at this temperature for 5½ hours. Mesitylgermanium tris(manganese tetracarbonyl triallylantimonite) is obtained in good yield.

Example XXV 5.21 parts of tri-alpha-naphthyltin manganese pentacarbonyl is added to 5.89 parts of trioctadecenylphosphine and 110 parts of durene. Reaction for 6 hours at 182–190° C. results in the formation of tri-alpha-naphthyltin manganese tetracarbonyl trioctadecenylphosphine.

Example XXVI

When 6.21 parts of bis(2-indenyl)lead bis(manganese pentacarbonyl) is mixed with 5.31 parts of triphenyl- arsenite and the mixture is heated under pressure to 183–194° C. for a period of 6 hours, bis(2-indenyl)lead bis(manganese tetracarbonyl triphenylarsenite) is obtained.

Example XXVII

Tetralin solutions of 5.84 parts of 2-fluorenylsilicon tris(manganese pentacarbonyl) and 10.78 parts of tri-m-cumenylstibine are mixed and the mixture is dissolved in 165 parts of tetralin. The solution is heated to 191–202° C. for 6½ hours. The product is 2-fluorenylsilicon tris(manganese tetracarbonyl tri-m-cumenylstibene).

The above examples have been presented by way of illustration and it is not intended to limit the scope of the invention thereby. Employing the procedures illustrated therein and the process of this invention, other products are produced by appropriate substitution of the group IV–A metal manganese pentacarbonyl and ligand reactants described hereinbefore. Thus, employing the process of this invention, the following products are also produced in high yield: trimethylsilicon manganese tetracarbonyl tripropylphosphine by reaction of trimethylsilicon manganese pentacarbonyl with tripropylphosphine; propyltin tris(manganese tetracarbonyl trioctylantimonite) from propyltin tris(manganese pentacarbonyl) and trioctylantimonite; diisobutylsilicon bis(manganese tetracarbonyl triallylarsine) by reaction of diisobutylsilicon bis(manganese pentacarbonyl) and triallylarsine; trioctyltin manganese tetracarbonyl triphenylphosphite by reaction of equimolar amounts of trioctyltin manganese pentacarbonyl and triphenylphosphite; cetylsilicon tris(manganese tetracarbonyl tricyclopentadienylstibine) from cetylsilicon tris(manganese pentacarbonyl) and tricyclopentadienylstibine; diallyltin bis(manganese tetracarbonyl trimesitylarsenite) by reaction of diallyltin bis(manganese pentacarbonyl) with trimesitylarsenite; triallylsilicon manganese tetracarbonyl trimethylphosphine from equimolar amounts of triallylsilicon manganese pentacarbonyl and trimethylphosphine; and m-tolyltin tris(manganese tetracarbonyl triisobutylantimonite) by reaction of m-tolyltin tris(manganese pentacarbonyl) with triisobutylantimonite. By similar procedures the following compounds are produced from the appropriate components: bis(m-cumenyl)silicon bis(manganese tetracarbonyl tricetylarsine), tris(methylcyclopentadienyl)tin manganese tetracarbonyl triallylphosphite, ethyl cyclopentadienylgermanium tris(manganese tetracarbonyl tri-m-cumenylstibine), diphenethyllead bis(manganese tetracarbonyl tribenzylarsenite), trimesitylsilicon manganese tetracarbonyl tri-alpha-naphthylphosphine, diindenyltin bis(maganese tetracarbonyl tripropylantimonite) and diethylgermanium bis(manganese tetracarbonyl triisobutylarsine).

Other examples of the products obtainable in high yield by the process of this invention will now be evident.

In carrying out the process of this invention the reactants are normally combined as indicated above in approximately stoichiometric proportions but the proportions employed can vary from a 100% or greater excess by weight of the carbonyl reactant to a 100% or greater excess of the ligand reactant. A slight excess of one reactant or the other, as about 10% by weight, is often used to bring about an increased reaction rate.

As indicated above the reactions of this invention are usually carried out by fusing the components together in the absence of any solvent. Where solvents are employed, however, they are such solvents which are essentially inert, and preferably liquid under the reaction conditions. Thus, they may include essentially inert hydrocarbons such as the xylenes, tetrahydronaphthalene, decarbons such as the xylenes, tetrahydronaphthalene, decahydronaphthalene, cumene, durene, isodurene, and 9,10-dihydroanthracene, and the like; halohydrocarbons such as alpha-chloronaphthalene, beta-chloronaphthalene, and the like; and ethers such as benzyl butyl ether, benzyl ethyl ether, butyl phenyl ether, butyl-o-tolyl ether, butyl-m-tolyl ether, butyl-p-tolyl ether, heptyl phenyl ether, and bis(p-chlorophenyl) ether, and the like. The solvent of choice is tetrahydronaphthalene because of its high boiling point, its relatively high solubility for the reactants (the latter being of particular value in that it facilitates separation of the solvent and recovery of the product) and its accessibility and ease of preparation.

The process may be carried out at any temperature and pressure in the absence of solvents within the liquid range of the lower melting reactant but below the decomposition temperature of the reactants or products. When solvents for at least one of the reactants are employed, the reaction temperature is subject to considerable latitude as from about room temperature and lower up to the decomposition temperature of the reactants or products. Ordinarily temperatures between about 100–250° C. are employed for the best results both in the presence and absence of a solvent. Generally the exposure of the reactants to ultraviolet radiation enhances the reaction and lower temperatures can be employed so that in such cases best results are obtained at temperatures between about 50–175° C.

Because the reactions ordinarily proceed at satisfactory rates under normal pressure conditions, atmospheric pressure is usually satisfactory but pressures ranging from 10 millimeters of mercury to 100 atmospheres may be used if desired, provided a liquid reaction system is maintained at least in part.

The process is usually carried out under an atmosphere inert to the reactants and products to prevent degradation. The compounds are stable on exposure at reaction temperature to dry nitrogen which can thus be used with safety. Other suitable protective atmospheres include dry helium, neon, argon, krypton and xenon.

The normally solid products of the process are soluble in and can be purified by recrystallization from a variety of organic solvents. Specifically, simple aromatic solvents such as benzene or toluene, simple aliphatic solvents such as hexane, alcohols such as ethanol, and halohydrocarbons such as methylene chloride and carbon tetrachloride and their mixtures are found to be satisfactory.

As stated above, the products obtained according to this invention are useful as antiknock agents for internal combustion engine fuels. They may suitably be employed in concentrations varying from that corresponding to about 0.005 gram of manganese per gallon to their saturation concentrations at ambient temperature. They are highly effective agents and their versatility is shown by the fact that they can be added to the fuel either alone or in combination with other antiknock agents such as tetraethylead. For example, the addition of 0.01 gram of manganese per gallon as triphenyllead manganese tetracarbonyl triphenylphosphine to a catalytically cracked gasoline increases the octane number thereof. Similar such enhancement in the octane number of fuels is obtained employing other products of this invention.

Furthermore, since the bimetallic compounds produced by the process are relatively unstable at temperatures greatly exceeding the temperatures of their formation, they can be used to plate an alloy of the component metals on a suitable substrate by contacting the heated substrate with the appropriate compound. The tin compounds of this invention are also excellent thermal stabilizers for polyvinyl chloride and the like.

Other uses for the products of this invention will now be evident.

Having thus described the novel process of synthesis for the bimetallic ligand compounds, it is not intended to be limited except as set forth in the following claims:

I claim:
1. The method of preparing a compound represented by the general formula

$$R_a X_b M^{IV}[Mn(CO)_4 ER'_3]_c$$

wherein R is a hydrocarbon radical having up to about 18 carbon atoms; R' is a radical selected from the group consisting of hydrocarbon and oxyhydrocarbon radicals having up to about 18 carbon atoms; X is a halogen; $M^{IV}$ is an element selected from group IV–A of the periodic system of the elements and having an atomic number from 14 to 82, inclusive; E is an element selected from group V–A of the periodic system of the elements and having an atomic number from 15 to 51, inclusive; $a$ and $b$ are small whole numbers from 0 to 3, inclusive, at least one of which is equal to at least 1; $c$ is a small whole number from 1 to 3, inclusive; and the sum of $a$, $b$, and $c$ is equal to 4; which comprises reacting a compound represented by the general formula $$R_a X_b M^{IV}[Mn(CO)_5]_c$$

with a reactant represented by the general formula $$ER'_3$$

wherein R, X, $M^{IV}$, E, R', $a$, $b$, and $c$ have the meaning herein set forth.

2. The method of claim 1 wherein the said reactant is triphenylphosphine.

3. The method of claim 1 wherein the said reactant is triphenylarsine.

References Cited in the file of this patent
Abel et al.: J.A.C.S. (1959), pp. 2323–2327.

UNITED STATES PATENT OFFICE

CERTIFICATE OF CORRECTION

Patent No. 3,030,397                        April 17, 1962

Richard D. Gorsich

It is hereby certified that error appears in the above numbered patent requiring correction and that the said Letters Patent should read as corrected below.

Column 1, line 58, for "haogen" read -- halogen --; column 2, line 52, for "(p-chorophenyl)" read -- (p-chlorophenyl) --; column 6, lines 12 and 13, for "cumenylstibene" read -- cumenylstibine --; lines 71 and 72, strike out "decarbons such as the xylenes, tetrahydronaphthalene, --.

Signed and sealed this 24th day of September 1963.

(SEAL)
Attest:

ERNEST W. SWIDER                              DAVID L. LADD
Attesting Officer                                Commissioner of Patents